United States Patent [19] [11] 4,066,734
Bockelmann et al. [45] Jan. 3, 1978

[54] ALKALINE DISINTEGRATION OF CHROMITES

[75] Inventors: Wolfgang Bockelmann, Leverkusen; Hans-Georg Nieder-Vahrenholz, Cologne; Hans Niederprüm, Duesseldorf; Heinz Jonas, Leverkusen, all of Germany

[73] Assignee: Bayer Aktiengesellschaft, Leverkusen, Germany

[21] Appl. No.: 721,129

[22] Filed: Sept. 7, 1976

[30] Foreign Application Priority Data

Sept. 20, 1975 Germany ............................ 2542054

[51] Int. Cl.² ........................................... C01G 37/00
[52] U.S. Cl. ..................................................... 423/61
[58] Field of Search ................... 423/53, 61, 595, 596, 423/597

[56] References Cited

U.S. PATENT DOCUMENTS

| 442,109 | 12/1890 | Donald | 423/61 |
|---|---|---|---|
| 1,752,863 | 4/1930 | Tarr | 423/61 |
| 1,901,939 | 3/1933 | Vetter | 423/596 |
| 2,381,236 | 8/1945 | Udy | 423/61 |
| 3,510,256 | 5/1970 | Schafer | 423/61 |
| 3,812,234 | 5/1974 | Schafer et al. | 423/61 |

Primary Examiner—G. O. Peters
Assistant Examiner—Brian E. Hearn
Attorney, Agent, or Firm—Burgess, Dinklage & Sprung

[57] ABSTRACT

In the alkaline-oxidative disintegration of chromites into chromates with an alkali comprising reacting a chromium ore in the presence of oxygen and a diluent, and leaching the reaction mixture with at least one of water and/or a chromate-containing aqueous solution, the improvement which comprises reacting the residue obtained after leaching with an excess of alkali, based on the chromium oxide content of the residue, in the presence of oxygen, grinding the reaction mixture and, without leaching, employing the ground reaction mixture as an alkali source in another chromite disintegration cycle. The alkali reacted with the leaching residue is preferably sodium and/or potassium hydroxide and/or carbonate and is employed in about 100 to 400%, and preferably about 150 to 330%, of the stoichiometric amount based on the chromium oxide content of the leaching residue.

3 Claims, 2 Drawing Figures

FIG. I.

ALKALINE DISINTEGRATION OF CHROMITES

This invention relates to a process for the alkaline disintegration of chromium ores (chromites) into chromates in the presence of oxygen. The process according to the invention enables the chromium oxide content of the ores to be converted into water-soluble chromate far more readily than with conventional processes. From this it follows that the chromium ore residue which is ultimately discarded contains a much smaller proportion of chromium compounds.

In the conventional process for disintegration of chromium ores, the finely powdered ore, which in addition to small quantities of $SiO_2$-containing gauge mostly contains isomorphous mixed crystals from the spinel series with the general formula (Fe(II), Mg) (Cr, Fe(III), Al)$_2$O$_4$, is heated with soda ash and/or sodium hydroxide in the presence of air at tempertures of from 900° to 1100° C in disc-type or annular-hearth furnaces or in rotary kilns to convert it into water-soluble $Na_2CrO_4$. Unfortunately, in cases where a quantity of alkali, equivalent to the $Cr_2O_3$-content of the ore is used, desintegration takes place unsatisfactorily because both soda or sodium oxide and also the chromate formed are in molten form at the high temperature required.

On the one hand, this means that oxygen is unable to diffuse adequately into the reaction mixture (incomplete disintegration). On the other hand, deposits, for example in the form of rings in rotary kilns are readily formed on the furnace walls.

In the conventional process for disintegration of chromium ores, these difficulties are avoided by adding inert solids as so-called diluents, or lean clays, i.e., substances which dilute the reaction mixture without becoming involved to any significant extent in the actual chemical reaction. Although lime or dolomite were once generally used for this purpose, they are now no longer used because of the formation of substantially insoluble calcium chromate.

Nowadays it is common practice to use leaching residues (so-called back ore) from a previous disintegration of chromium ore and iron oxide in quantities of up to 50% of the reaction mixture as a whole (cf. for example U.S. Pat. No. 2,904,396). The quantity of diluent used is essentially governed by the type of furnace used, because in disc-type or annular-hearth furnaces, up to about 35 to 40% of sodium chromate can be present in the reaction mixture, whereas in rotary kilns only about 25 to 28% of sodium chromate can be present, in other words heavier dilution is required in this case (Ullmanns Encyclopaedie der Techn. Chemie, IIIrd Edition, Vol. 5 (1954, page 572). In the rotary kiln process, therefore, about 150 to 200 parts of dried leaching residues so-called "back ore" and about 0 to 50 parts of iron oxide (roasting residues) are used per 100 parts of fine ore (grinded ore), cf. German Pat. No. 1,533,076.

Dilution may also be carried out using chromium ore itself, i.e., in several stages using a deficit of alkali (so-called multistage process).

One disadvantage of these disintegration processes of chromium ores into chromates is that, even in the case of a "chemical grade" chromium ore with a $Cr_2O_3$-content of about 45%, the yield of water-soluble chromate only amounts to between about 75 and 85%, in other words up to about one quarter of the chromium present in the ore did not react but remains in the leaching residue and, unless it is reused for dilution, is ultimately dumped as sludge.

Accordingly, in view of the increasing shortage of starting materials for the production of dichromates, especially "chemical" chromium ores (chemical grade = high-iron chromite, the name used by the U.S. Bureau of Mines), improved methods of disintegration chromium ores are of considerable significance. The yield of chromate is particularly low in cases where metallurgical or refractory-grade chromium ores (metallurgical grade = high-chromium chromite, refractory grade = aluminum chromite) are used. In the case of metallurgical-grade ores in particular, it is not only the often very high content of $SiO_2$ from the gangue which binds alkali, but also the generally high content of MgO in the spinel lattice of the chromite which is instrumental in reducing yield (cf., P. Dilthey and J. Weise in Winnacker-Küchler, Chemische Technologie, Vol. 2 (1970), pages 87/88, C. Hanser-Verlag Munich).

It is known from the analysis of chromium ores and chromium-containing residues that the chromium content can be quantitatively converted into chromate by working in a bath of molten alkali in the presence of oxidizing agents, for example sodium peroxide or saltpeter. This knowledge was experimentally applied some considerable time ago to the industrial disintegration of chromite, for example by oxidizing the chromite in a melt bath of excess sodium hydroxide by introducing air or oxygen (cf., for example German Pat. No. 171,089), optionally in the presence of oxygen carriers (cf., for example German Pat. No. 163,814, and German Offenlegungsschrift No. 2,329,925).

However, it has not been possible to adopt processes on this basis for working on a commercial scale because, in addition to the $Cr_2O_3$ present, the other constituents present in the ore, especially the aluminum oxide, are co-disintegrated. Accordingly, further separation of the sodium chromate formed is considerably complicated in this way.

Accordingly, the object of the present invention is to find a commercially workable process by which the available chromites can be better utilized.

The present invention relates to a process for the alkaline-oxidative disintegration of chromites with alkali compounds in the presence of oxygen and diluents, followed by leaching of the reaction mixture with water and/or chromate-containing aqueous solutions, wherein the residue obtained after leaching with water and/or chromate-containing solutions is again reacted either wholly or in part with an excess of alkali, based on the chromium oxide content of the residue, in the presence of oxygen, the reaction mixture obtained is ground and, without leaching, is re-used as alkali source for the disintegration chromite.

It has surprisingly been found that the difficulties described above can be avoided by reacting the dried leaching residue, which is normally dumped after a conventional disintegration process, substantially completely in a second stage using excess soda and/or sodium hydroxide or the corresponding potassium compounds in the presence of air, and directly using the reaction mixture ground after cooling, which contains substantially no free alkali carbonate, instead of soda ash or sodium hydroxide or the corresponding potassium compounds in a third stage as disintegration agent for more fresh chromite. The alkali compounds formed during this disintegration of leaching residues, for example sodium aluminate $NaAlO_2$, sodium silicate $Na_2SiO_3$, sodium ferrite or ferrate (III) $Na_2Fe_2O_4$ or $NaFeO_2$, and more complicated compounds, such as sodium aluminum silicates (for example sodalith $Na_2O \cdot Al_2O_3 \cdot 20SiO_2$), act as alkali donors when reused for the disintegration of chromite, soluble alkali chromate and insoluble iron, silicon and aluminum oxides, which can be filtered off after leaching with water, being formed under the effect of the oxygen.

This reaction was not readily foreseeable because, at high temperatures, $SiO_2$ and, to a lesser extent, $Al_2O_3$ could have been expected to act as non-volatile acids and, for example in accordance with the following equations:

$$Na_2CrO_4 + SiO_2 \rightarrow Na_2SiO_3 + CrO_3$$

or $$Na_2CrO_4 + Al_2O_3 \rightarrow Na_2Al_2O_4 + CrO_3$$

to liberate the more volatile chromium oxide (evaporation or sublimation at only the melting point of about 190° C) from the sodium chromate formed (cf. F. Seel, Grundlagen der analytischen Chemie, Verlag Chemie, 1970, page 236). However, chromium trioxide is not stable at elevated temperatures and, even at temperatures as low as about 500° C, decomposes completely into chromium (III) oxide and oxygen (Gmelins Handbuch der Anorg. Chemie. 8th Edition, Chromium, Part B (1962), pages 15, 111, 113).

Accordingly, the smooth reaction, for example in accordance with $$2 Na_2SiO_3 + Cr_2O_3 + 1.5 O_2 \rightarrow 2 Na_2CrO_4 + 2 SiO_2$$

was not foreseeable and is presumably explained by the fact that an excess of oxygen was used.

In its general embodiment, the process according to the invention is carried out by treating with excess alkali (based on the $Cr_2O_3$-content) in the presence of oxygen all or part of the leaching residue obtained after disintegration of the chromite and subsequent leaching. After cooling, the reaction mixture obtained during this second disintegration is grinded without being leached, contacted with more chromite and then converted under oxidizing conditions. The reaction mixture obtained in this way is then leached and the leaching residue, which now contains only very little chromium, is discarded (cf. FIG. 1, flow chart of the process) or partly reused as diluent.

The quantity of alkali carbonate or alkali hydroxide required for complete disintegration of the leaching residue is governed by the type of chromite used and by the type of furnace, for example disc-type furnace or rotary kiln, in which the disintegration is carried out. In general, the quantity of alkali amounts to between about 100 and 400% and preferably to between about 150 and 330%, based on the $Cr_2O_3$-content of the ore residue used as starting material, in accordance with the equation $$Cr_2O_3 + 2 Na_2CO_3 + 1.5 O_2 \rightarrow 2 Na_2CrO_4 + 2 CO_2$$

In general, the quantity of alkali compounds should be as small as possible because otherwise too much fine ore has to be used for further processing because, since the aqueous chromate solution from the disintegration mixture has to be as alkali-free as possible for the further processing in order to guarantee substantial freedom from aluminum and, hence, to avoid filtration difficulties during acidification, the quantity of alkali present in the reaction mixture of leaching residue and alkali carbonate or alkali hydroxide must correspond exactly to the chromium oxide content of the fresh quantity of chromite used. Since the residue left after further processing is finally discarded as sludge and since the yields of $Na_2CrO_4$ from the fine ore added in the third stage are again within the usual limits of stage I, as little fine ore as possible should be introduced into the third stage in order to obtain as high a total chromate yield as possible over all stages. It may be more favorable in some cases to convert only part, for example 90% based on its $Cr_2O_3$-content, of the leaching residue from the first stage with a smaller excess of alkali, so that correspondingly less fine ore is required in a third stage, cf., the Table in Example 1. In addition, the volume-time yield is increased by this measure.

In addition, the ore residue disintegration mixture may also be diluted, for example with iron oxide or with dried leaching residue from the third stage, in order to make it easier to handle, although this is not generally necessary because this mixture itself contains enough inert constituents for dilution.

An treatment in the third stage may be carried out under the usual conditions, i. e., the disintegration mixture is so heavily diluted with ore residue from the last stage that, in a rotary kiln for example, the product formed has a chromate content of about 25% of $Na_2CrO_4$.

The fully reacted mixture from the third stage may be leached and acidified by conventional means, (for example with water or chromate-containing solutions; acidification is carried out in the usual way with sulfuric acid or carbon dioxide). The insoluble fractions are removed by filtration and are ultimately dumped. The advantage of the process according to the invention lies in a distinct improvement in yield (under optimum conditions, it is possible to obtain yields over all stages of more than 95%) and hence in a reduced $Cr_2O_3$-content, for example only about 2 to 4%, of the final chromate sludge.

In one variant of the process according to the invention, the reaction mixture from the third stage is not separately leached, but instead is combined with the disintegration mixture from the first stage and filtered together with it after leaching. The resulting leaching residue is partly recycled for dilution stages I and III, partly discarded according to the input of fine ore and partly completely converted.

In another variant of the process according to the invention (cf., flow chart, FIG. 2), the reaction mixture of leaching residue and excess alkali carbonate and/or alkali hydroxide from stage II is directly used as alkali source for the disintegration of chromite in stage I. In this way only two disintegration furnaces and only one leaching and filter station are required. To ensure that the material balance of the entire process remains in equilibrium, part of the leaching residue which is not required for dilution (in the case of a chromite containing about 45% of $Cr_2O_3$, approximately 50 to 55% of the quantity of fine ore used) has to be continuously removed and dumped. Since on the one hand chromite, alkali carbonate and/or alkali hydroxide and oxygen are introduced into the system, while on the other hand alkali chromate, $CO_2$ and/or water are removed, the difference represents the quantity of leaching residue to be removed plus chromium and alkali losses.

One surprising feature of this variant of the process is that, after a few disintegration cycles, the yield of chromate is higher than had been expected from a purely theoretical assessment of the process. The yield of chromate might have been expected to represent an average value between the conventional degree of disintegration of, for example, 75% and the degree of disintegration of the three-stage process of, for example, 95%. Catalytic effects may possibly play a part because it is not alkali carbonate and/or alkali hydroxide, but a mixture of alkali salts, for example of iron and aluminum, that is used as the reagents, which could influence the reaction mechanism which is known to be very complicated. This continuous increase in the chromate yield during the continuous working of the process is automatically accompanied by a reduction in the $Cr_2O_3$-content of the leaching residue removed, so that the excess of alkali, based on the $Cr_2O_3$-content, increases and the alkali is increasingly bonded to the secondary constituents of the chromite.

In this variant of the process, the quantity of alkali required for treating the fine ore may be used either completely or partly in the form of the reaction mixture of leaching residue and alkali carbonate and/or alkali hydroxide; the residual quantity is optionally delivered directly to stage I.

Thus, it is possible by virtue of the process according to the invention to convert the $Cr_2O_3$-content of the leaching residue from the conventional disintegration of chromite substantially completely into chromate in a separate reaction stage using an excess of soda-ash and-/or sodium hydroxide or the corresponding potassium compounds. Accordingly, not only is the excess alkali utilized to form chromate, the previously formed, highly undesirable alkali aluminate, ferrite and silicate are also re-decomposed with separation of the insoluble oxides, so that the aqueous chromate solution ultimately obtained is no longer contaminated by aluminate or silicate.

BRIEF DESCRIPTION OF THE DRAWINGS

The invention will be further described with reference to the accompanying drawings wherein.

Figure 1:
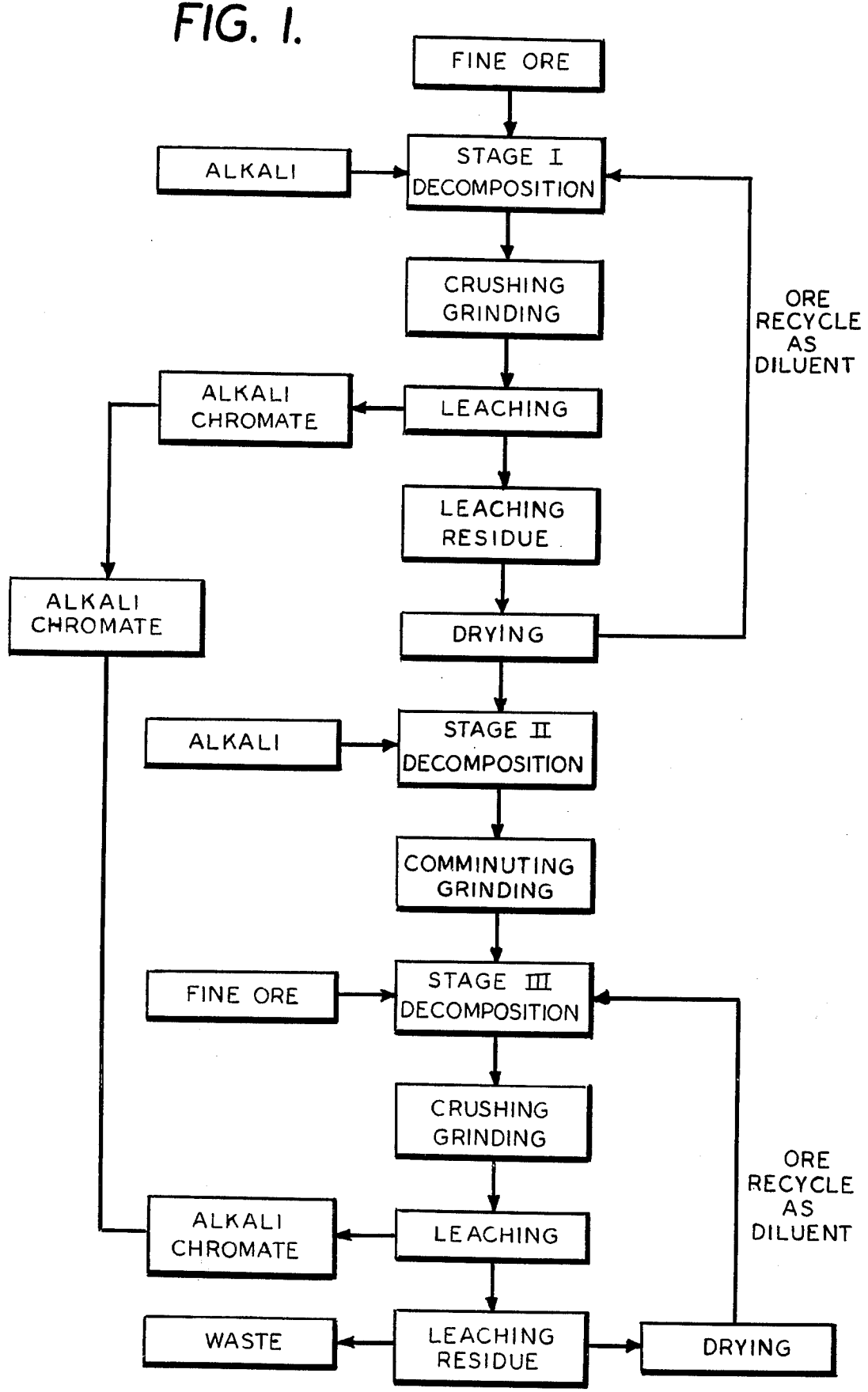
FIG. 1 is a flow sheet of a three-stage reaction process in accordance with the present invention.

Referring now more particularly to the drawing, in the three-stage process of FIG. 1 the leaching residue is treated with alkali in stage II while in stage III the reaction product together with fine ore forms another reaction stage.

Figure 2:
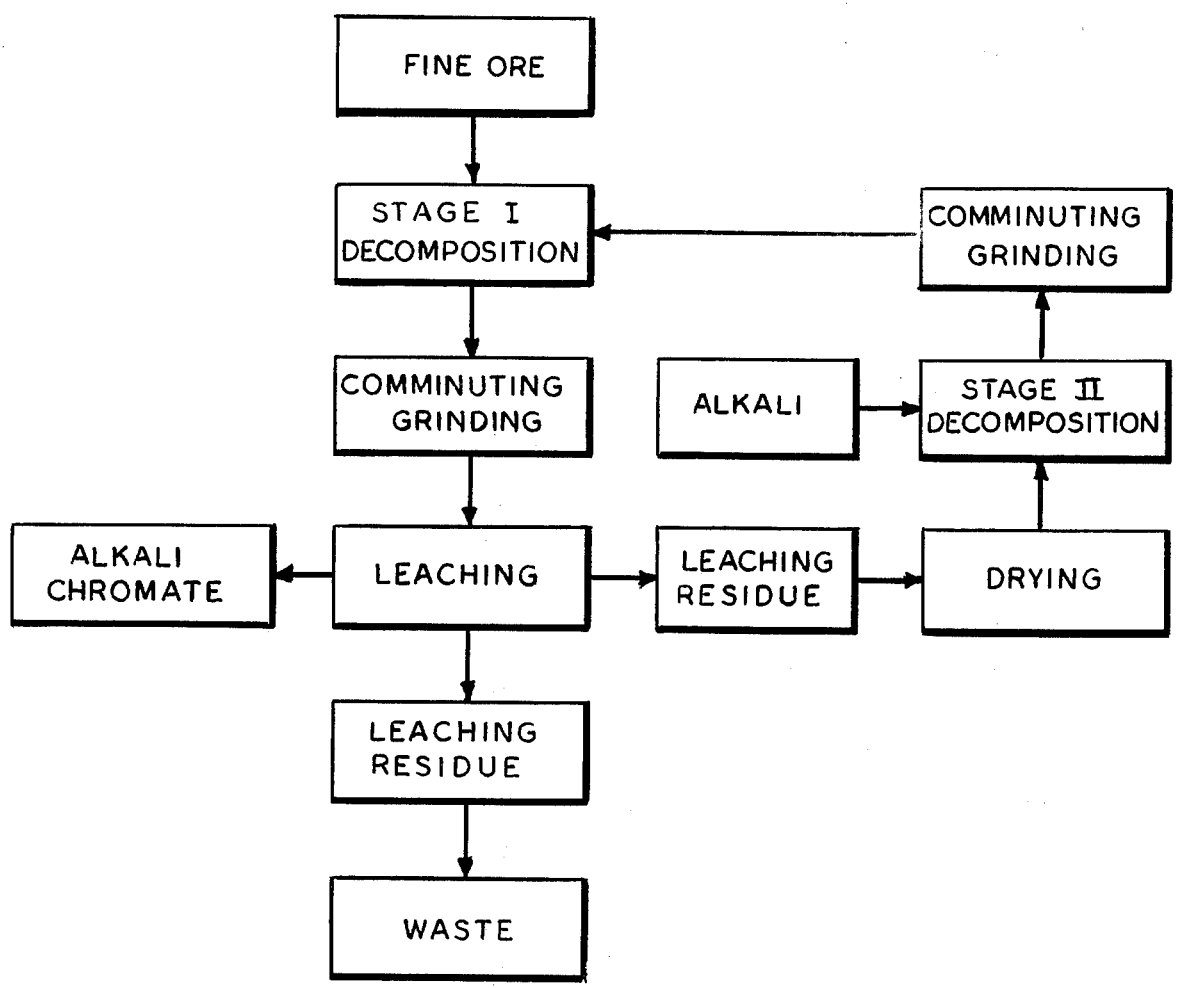
FIG. 2 is a flow sheet of a two-stage reaction process in accordance with the present invention.

In FIG. 2, the reaction mixture of leaching residue and excess alkali from stage II is directly delivered as alkali source to stage I (disintegration).

The process according to the invention is further illustrated by the following Examples in which the parts quoted are always parts by weight.

EXAMPLE 1

(Treatment of the Leaching Residue)

50 parts of a washed and dried leaching residue containing 13.1% of $Cr_2O_3$ (balance $Fe_2O_3$, $Al_2O_3$, MgO, $Na_2O$, $SiO_2$ and traces of CaO and $TiO_2$), obtained in the usual way by treating and leaching a chemical-grade chromite, were calcined for 2 hours at 1080° C in the presence of air in an electrically heated muffle furnace, the quantity of soda-ash added being gradually increased. This was followed by leaching and filtration; the filtrate and leaching residue were then analyzed. The results are set out in the following Table:

| % Soda-ash of theoretical Yield of $Na_2CrO_4$ | % of theoretical yield | % of $Cr_2O_3$ in the residue |
| --- | --- | --- |
| 0 | 3.7 | 11.7 |
| 100 | 57.0 | 7.8 |
| 150 | 75.2 | 4.3 |
| 200 | 89.2 | 1.9 |
| 225 | 94.2 | 1.2 |
| 250 | 96.8 | 0.6 |
| 275 | 99.0 | 0.2 |
| 300 | 100.0 | 0.05 |

EXAMPLE 2 a. In the same way as in Example 1, a mixture of 100 parts of chemical-grade chromite containing approximately 45% of $Cr_2O_3$, 28% of $Fe_2O_3$, 15% of $Al_2O_3$, 10% of MgO, 2% of $SiO_2$, was calcined with 65 parts of soda-ash and 180 parts of leaching residue for 2 hours at 1080° C in the presence of air in an electrically heated muffle furnace. After leaching with water, 82.53 parts of sodium chromate (84.9% of the theoretical) and 251.4 parts of leaching residue containing 11.9% of $Cr_2O_3$ were obtained. Of the resulting 251.4 parts of residue, 180 parts are used as diluent for the next disintegration cycle.

b. The remaining 71.4 parts of residue were calcined with 32.62 parts of soda-ash (275% of the theoretical) for 2 hours at 1080° C in the presence of air in an electrically heated muffle furnace (approximately 100% disintegration of the $Cr_2O_3$ into sodium chromate).

c. The cooled mixture obtained from stage (b) — 92.03 parts with 12.14 parts of $Na_2O$ and 18.12 parts of sodium chromate — is grinded and calcined with 32.63 parts of chromite (= stoichiometric) for 2 hours at 1080° C in the presence of air in an electrically heated muffle furnace. After leaching 43.68 parts of sodium chromate (80.6% of the theoretical) and 81.42 parts of leaching residue containing 1.5% of $Cr_2O_3$ (dumped) were obtained.

The total yield of sodium chromate over all three stages amounted to 126.21 parts (97.9% of the theoretical yield). The yield of soda amounted to 84.6%.

EXAMPLE 3 a. A mixture of 100 parts of chemical-grade chromite containing 45% of $Cr_2O_3$ (cf., Example 2) was calcined with 65 parts of soda-ash and 180 parts of ore residue for 2 hours at 1080° C in the presence of air in an electrically heated muffle furnace. After leaching 82.53 parts of sodium chromate (84.9% of the theoretical) and 251.4 parts of leaching residue containing 11.9% of $Cr_2O_3$ were obtained. Of these 251.4 parts of residue, 180 parts are used as diluent for the next disintegration cycle.

b. The remaining 71.4 parts of residue were calcined with only 26.08 parts of soda-ash (200% of the theoretical) for 2 hours at 1080° C in the presence of air in an electrically heated muffle furnace (approximately 90% conversion of the $Cr_2O_3$ into sodium chromate).

c. The cooled reaction mixture from stage (b) — 91.04 parts containing 8.64 parts of $Na_2O$ and 16.16 parts of sodium chromate — was grinded and calcined with 22.4 parts of chromite (= stoichiometric) for 2 hours at 1080° C in the presence of air in an electrically heated muffle furnace. After leaching 33.40 parts of sodium chromate (78% of the theoretical) and 77.66 parts of leaching residue containing 2.0% of $Cr_2O_3$ (dumped) were obtained. The aqueous chromate solution was substantially free from aluminum.

The total yield of sodium chromate over all three stages amounted to 115.93 parts (97.2% of the theoretical yield). The yield of soda amounted to 83.3%.

EXAMPLE 4 a. A mixture of 100 parts of chemical-grade chromite containing 45% of $Cr_2O_3$ (cf., Example 2) was calcined with 65 parts of soda-ash and 180 parts of "back ore" for only 45 minutes at 1080° C in the presence of air in an electrically heated muffle furnace. After leaching, 62.63 parts of sodium chromate (64.4% of the theoretical) and 266.3 parts of residue containing 15.8% of $Cr_2O_3$ are obtained. Of these 266.3 parts of leaching residue, 180 parts are used as diluent for the next disintegration cycle.

b. The remaining 86.3 parts of residue were calcined with 47.55 parts of soda-ash (250% of the theoretical) for 1.5 hours at 1080° C in the presence of air in an electrically heated muffle furnace (approximately 100% conversion of the $Cr_2O_3$ into sodium chromate).

c. The cooled reacted mixture from stage (b) — 116.62 parts containing 16.69 parts of $Na_2O$ and 29.07 parts of sodium chromate — was grinded and calcined with 44.87 parts of chromite (= stoichiometric) for 2 hours at 1080° C in the presence of air in an electrically heated muffle furnace.

After leaching, 64.82 parts of sodium chromate (81.9% of the theoretical) and 100.74 parts of leaching residue containing 6.3% of $Cr_2O_3$ (dumped) were obtained. The chromate liquor obtained was free from aluminum. The total yield of sodium chromate over all three stages amounted to 127.45 parts (90.5% of the theoretical). The yield of soda amounted to 74.1%.

EXAMPLE 5 a. A mixture of 100 parts of metallurgical-grad chromite containing 52% of $Cr_2O_3$, 14% of $Fe_2O_3$, 18% of MgO, 10% of $Al_2O_3$ and 5% of $SiO_2$, was calcined with 65 parts of soda-ash (= 90% of the theoretical) and 180 parts of leaching residue according to Example 1 for 45 minutes at 1080° C in the presence of air in an electrically heated muffle furnace. After leaching, 65.61 parts of sodium chromate (59.1% of the theoretical) and 268.98 parts of residue containing 17.8% of $Cr_2O_3$ were obtained. Of these 268.98 parts of residue, 180 parts were used as diluent for the next disintegration.

b. The remaining 88.98 parts of residue were calcined with 44.12 parts of soda-ash (200% of the theoretical) for 1.5 hours at 1080° C in the presence of air in an electrically heated muffle furnace (approximately 90% dissociation of the $Cr_2O_3$ into sodium chromate).

c. The cooled reaction mixture from stage (b) — 133.1 parts containing 12.9 parts of $Na_2O$ and 30.4 parts of sodium chromate — was grinded and calcined with 30.36 parts of chromite for 2 hours at 1080° C in the presence of air in an electrically heated muffle furnace. After leaching, 57.94 parts of sodium chromate (81.7% of the theoretical) and 112.32 parts of leaching residue containing 8.9% of $Cr_2O_3$ (dumped) were obtained. The total yield of sodium chromate over all three stages amounted to 123.55 parts (85.3% of the theoretical). The yield of soda amounted to 74.1%.

EXAMPLE 6 a. A mixture of 195 parts of leaching residue (containing 4.5% of $Cr_2O_3$) from a previous disintegration of chromite with alkali and 73.3 parts of soda-ash was heated in the presence of air to 1050° C over a period of 45 minutes in an electrically heated muffle furnace. The excess of soda-ash, based on the $Cr_2O_3$ present in the leaching residue, amounted to approximately 600%.

b. After grinding, the cooled reacted charge was mixed with 100 parts of chemical chromite (45% of $Cr_2O_3$) and 15 parts of iron oxide ("roasting residues") and recalcined for 45 minutes in the presence of air. After leaching, 92.4 parts of sodium chromate were obtained from 368 parts of mixture. The solution was substantially free from aluminum. The leaching residue (275.6 parts) contained 4.5% of $Cr_2O_3$. 195 parts of the residue were dried and then recalcined with 73.3 parts of soda-ash (stage a), the remainder of 80.6 parts being dumped. The total yield of sodium chromate, based on the chromite used, amounted to 96% of the theoretical yield, the yield of soda amounted to 82.5% of the theoretical.

EXAMPLE 7 a. A mixture of 225 parts of $Fe_2O_3$ and 75 parts of soda (25% of the theoretical for $NaFeO_2$) was calcined for 2 hours at 1080° C in the presence of air in an electrically heated muffle furnace.

b. 100 parts of metallurgical-grade chromite containing 48% of $Cr_2O_3$ were calcined in air for 2 hours at 1080° C in an electric muffle furnace with 239.7 parts of the cooled and grinded mixture from stage (a) — containing 39.2 parts of $Na_2O$ (= 100% of the theoretical) — and 78 parts of $Fe_2O_3$ as diluent. After leaching 84.2 parts of sodium chromate (82.3% of the theoretical) were obtained, the free alkali content of the liquor was 0.4%, it was free from aluminum. Leaching left 338 parts of residue containing 2.5% of $Cr_2O_3$ (dumped).

The yield of soda-ash amounted to 82.2%.

Comparison Example

For comparison, a mixture of 100 parts of metallurgical-grade chromite containing 48% of $Cr_2O_3$ was conventionally calcined in air for 2 hours at 1080° C in an electrical muffle furnace with 67 parts of soda-ash (= stoichiometric), 180 parts of leaching residue and 15 parts of $Fe_2O_3$ (roasting residues) as diluent. 68.4 parts of sodium chromate (67% of the theoretical) were obtained after cooling and leaching of the reaction mixture, the free alkali content amounted to 3.0%. Leaching left 248 parts of residue containing 16% of $Cr_2O_3$. The soda-ash yield amounted to 66.8%. The aqueous chromate solution contained considerable quantities of free alkali.

It will be appreciated that the instant specification and examples are set forth by way of illustration and not limitation, and that various modifications and changes may be made without departing from the spirit and scope of the present invention.

What is claimed is:

1. In the alkaline-oxidative disintegration of chromites into chromates with an alkali which is at least one member selected from the group consisting of sodium and potassium hydroxides and carbonates, comprising reacting a chromium ore with said alkali in the presence of oxygen and a diluent, and leaching the reaction mixture with at least one of water and/or a chromate-containing aqueous solution, the improvement which comprises heating the residue obtained after leaching with an excess of alkali, based on the chromium oxide content of the residue, in the presence of oxygen, the alkali being at least one member selected from the group consisting of sodium and potassium hydroxides and carbonates, grinding the reaction mixture and, without leaching, employing the ground reaction mixture as an alkali source in another chromite disintegration cycle.

2. A process as claimed in claim 1, wherein the alkali is employed in about 100 to 400% of the stoichiometric amount based on the chromium oxide content of the leaching residue.

3. A process as claimed in claim 1, wherein the alkali is employed in about 150 to 330% of the stoichiometric amount based on the chromium oxide content of the leaching residue.

* * * * *